(12) United States Patent
Kong et al.

(10) Patent No.: US 8,882,420 B2
(45) Date of Patent: Nov. 11, 2014

(54) TIRE PUNCTURE REPAIR TOOL

(75) Inventors: C. Kwai Kong, Gilroy, CA (US); Patrick L. Ohm, Mesa, AZ (US); Silas Veloz, Loma Linda, CA (US); Randy Lee, Phoenix, AZ (US)

(73) Assignee: Bell Automotive Products, Inc., Scottsdale, AZ (US)

( * ) Notice: Subject to any disclaimer, the term of this patent is extended or adjusted under 35 U.S.C. 154(b) by 160 days.

(21) Appl. No.: 13/463,630

(22) Filed: May 3, 2012

(65) Prior Publication Data

US 2013/0177369 A1    Jul. 11, 2013

Related U.S. Application Data

(60) Provisional application No. 61/585,583, filed on Jan. 11, 2012.

(51) Int. Cl.
*F16B 31/00* (2006.01)
(52) U.S. Cl.
USPC .................................. 411/5; 152/370; 81/15.7
(58) Field of Classification Search
USPC .................. 411/2–5, 396, 409; 152/367–370; 81/15.7
IPC ............................................. F16B 31/00,23/00
See application file for complete search history.

(56) References Cited

U.S. PATENT DOCUMENTS

| 1,188,305 | A | * | 6/1916 | Noerteman | 411/409 |
| 2,292,557 | A | * | 8/1942 | Wilson | 470/59 |
| 3,151,512 | A | * | 10/1964 | Charczenko | 81/176.2 |
| 3,296,048 | A | * | 1/1967 | Wolfe | 156/97 |
| 3,343,443 | A | * | 9/1967 | Moore | 411/5 |
| 4,096,901 | A | * | 6/1978 | Reichenbach | 152/370 |
| 5,928,236 | A | * | 7/1999 | Augagneur et al. | 606/305 |
| 6,699,248 | B2 | * | 3/2004 | Jackson | 606/300 |
| 6,811,552 | B2 | * | 11/2004 | Weil et al. | 606/311 |
| 7,846,167 | B2 | * | 12/2010 | Garcia et al. | 606/104 |
| 8,010,836 | B2 | * | 8/2011 | Fukui et al. | 714/6.3 |
| 8,382,810 | B2 | * | 2/2013 | Peterson et al. | 606/306 |
| 2006/0228186 | A1 | * | 10/2006 | Shinjo | 411/5 |
| 2007/0106283 | A1 | * | 5/2007 | Garcia et al. | 606/1 |

* cited by examiner

*Primary Examiner* — Gary Estremsky
(74) *Attorney, Agent, or Firm* — Booth Udall Fuller, PLC

(57) ABSTRACT

A tire puncture repair apparatus may include a handle, a puncture repair screw, and an integral neck between the handle and the puncture repair screw. The puncture repair screw may include a screw head, a cylindrical shaft extending from the screw head opposite the neck, a partially threaded and solid cone that uniformly narrows from the shaft to a tip opposite the shaft, and a conic-helical thread coiled about the cone between the tip and the shaft. The diameter of the shaft may be approximately equal to the diameter of the cone at the widest point of the cone. The thread on the cone may include an angled ridge and may be coiled around the cone from the intersection of the shaft and the cone to before tip of the cone.

18 Claims, 7 Drawing Sheets

TIRE PUNCTURE REPAIR TOOL

CROSS REFERENCE TO RELATED APPLICATIONS

This document claims the benefit of the filing date of U.S. Provisional Patent Application 61/585,583 entitled "TIRE PUNCTURE REPAIR TOOL" to Kong that was filed on Jan. 11, 2012, the contents of which are hereby incorporated by reference.

BACKGROUND

1. Technical Field

Aspects of this document relate generally to tire puncture repair apparatuses.

2. Background Art

Flat tires are a frustration to most, if not all drivers at some point in the life of an automobile. Flat tires are often the result of a puncture in the tire, a puncture caused by nails, screws, or other natural or manmade debris. Various tire puncture repair tools exist to repair tubeless tires. Conventional tire puncture repair tools able to be used at the site of the flat tire with the tire on the rim (as opposed to removing the tire from the rim in a repair shop), however, do not securely fasten within the tire. For screw types, the puncture repair screw may slip out of the puncture, or significant air loss may occur even when the puncture repair screw is within the puncture of the tire due to the structure of the screw-type device.

SUMMARY

A first aspect of a tire puncture repair apparatus, comprises a handle, a puncture repair screw, the puncture repair screw comprising a screw head, a cylindrical shaft extending from the screw head opposite the neck, an at least partially threaded and solid right circular cone that uniformly narrows from the shaft to a tip opposite the shaft, and a conic-helical thread coiled about the right circular cone between the tip and the shaft, and an integral neck, narrower than the screw head and positioned between the handle and the puncture repair screw coupled to the screw head, and wherein a shaft diameter is substantially equal to a cone diameter at the right circular cone's maximum diameter.

In particular implementations and embodiments, the tire puncture repair apparatus may comprise one or more of the following. The thread may comprise an angled ridge. The thread may be coiled about the cone beginning at least at an intersection of the cone and the shaft and ending at a location before the tip. The handle may comprise a winged formation. An angled valley may be located between each coil of the conic-helical thread. A rounded valley may be located between each coil of the conic-helical thread. The conic-helical thread may comprise a right handed conic-helical thread. The handle may comprise at least two wings extending away from the puncture repair screw in mirrored opposing directions from each other to form the handle. At least one grip element may be on the at least two wings. The shaft may comprise a helical shaft thread coiled about the shaft.

A second aspect of a tire puncture repair apparatus comprises a handle, a puncture repair screw coupled to the handle, the puncture repair screw comprising a screw head coupled to the handle and a uniformly tapered screw thread, the uniformly tapered screw thread comprising an angled ridge wrapped about a right circular cone in the form of a conic helix.

In particular implementations and embodiments, the tire puncture repair apparatus may comprise one or more of the following. A breakable neck may be coupled between the puncture repair screw and the handle. The puncture repair screw may comprise a shaft coupled between the screw head and the uniformly tapered screw head, and a tip opposite the shaft. The uniformly tapered screw head may taper from the shaft such that a shaft diameter is equal to a cone diameter at the right circular cone's maximum diameter. The thread may be coiled about the cone beginning at least at an intersection of the cone and the shaft and ending at a location before the tip. The handle may comprise at least two wings extending away from the puncture repair screw in mirrored opposing directions from each other to form the handle. At least one grip element may be located on the at least two wings. An angled valley may be located between each coil of the conic-helical thread. A rounded valley may be located between each coil of the conic-helical thread.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. §112, ¶ 6. Thus, the use of the words "function," "means" or "step" in the Detailed Description or Description of the Drawings or claims is not intended to somehow indicate a desire to invoke the special provisions of 35 U.S.C. §112, ¶ 6, to define the invention. To the contrary, if the provisions of 35 U.S.C. §112, ¶ 6 are sought to be invoked to define the inventions, the claims will specifically and expressly state the exact phrases "means for" or "step for, and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. §112, ¶ 6. Moreover, even if the provisions of 35 U.S.C. §112, ¶ 6 are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The invention will hereinafter be described in conjunction with the appended drawings, where like designations denote like elements, and.

DESCRIPTION

Figure 1:
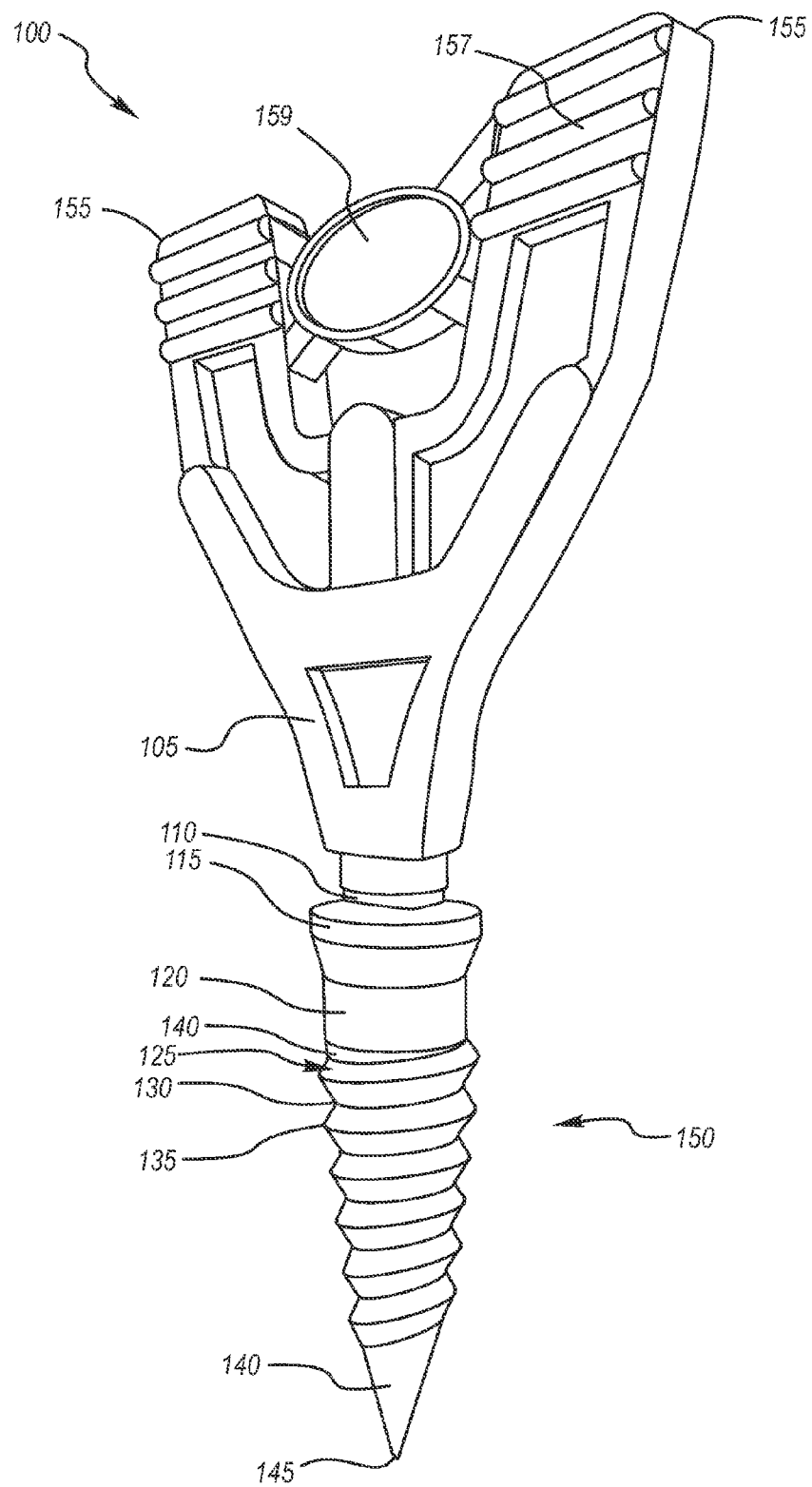
FIG. 1 is a perspective view of a tire puncture repair tool.

This disclosure, its aspects and implementations, are not limited to the specific components or assembly procedures disclosed herein. Many additional components and assembly procedures known in the art consistent with the intended tubeless tire puncture repair tools and/or assembly procedures for a tubeless tire puncture repair tool will become apparent for use with implementations of tire puncture repair tools from this disclosure. Accordingly, for example, although particular tire puncture repair tools are disclosed, such tire puncture repair tools and implementing components may comprise any shape, size, style, type, model, version, measurement, concentration, material, quantity, and/or the like as is known in the art for such tire puncture repair tool and implementing components, consistent with the intended operation of tire puncture repair tools.

Implementations of a tire puncture repair tool 100 disclosed herein provide a puncture repair screw 150 configured to improve the functionality and effectiveness of the tire puncture repair tool. As shown in FIGS. 1-5, an implementation of a tire puncture repair tool comprises a handle 100, a puncture repair screw 150, a neck 110 connecting the puncture repair screw 150 and the handle 105. The handle 105 may comprise a variety of sizes, shapes, and configurations that allow a user to apply rotational force to the handle to rotate the puncture repair screw.

In a particular implementation, the handle 105 comprises winged edges 155 that extend radially outward beyond the diameter edge of the screw head to allow for greater torque when manually rotating the tire puncture repair tool 100. Various implementations may further comprise at least one grip element 157 on or near the winged edges 155 of the handle. The at least one grip element may comprise any size, shape or texture that gives the user an increased grip on the tire puncture repair tool when in use. In the illustrated implementation, the at least one grip element comprises rounded ridges. In other implementations, the at least one grip element 157 may comprise squared or pointed ridges. In still other implementations, the at least one grip element 157 may comprise a rough surface or any material that increases the friction between the user's hand and the handle 105 of a tire puncture repair tool 100.

An implementation of the tire puncture repair tool 100 may further comprise a support structure 159 positioned between and/or coupled to the opposing arms of the winged edges 155. The support structure may, in various implementations, perform a variety of functions, including but not limited to: increased surface area for gripping the handle 105; support for the winged edges 155, or a print location for names, logos, and the like.

The neck 110 of the tire puncture repair tool may comprise any size, shape or configuration that allows a user to rotate the puncture repair screw 150 by rotating the handle 105 when the puncture repair screw 150 is at least partially within a tire, then separate the handle 105 from the puncture repair screw 150 once the puncture repair screw 150 is secure within the tire. In FIG. 1, the neck 110 comprises narrow extension between the handle 105 and the screw head 115. Once the puncture repair screw 150 is within a tire, a user may either continue rotating the handle 105 until the neck 110 breaks, or may alternatively bend the handle 105 in various directions perpendicular to the puncture repair screw 150 until the neck 110 breaks. When the neck 110 breaks, the handle 105 may be removed from the puncture repair screw 110, the puncture repair screw 110 remaining within the tire puncture.

In an implementation, the puncture repair screw 150 comprises a screw head 115 coupled to the neck 110, a shaft 120, a screw thread 125, a right circular cone 140, and a tip 145 distal to the screw head 115. As illustrated in FIG. 1, in an implementation the shaft 120 extends from the screw head 115 in a direction distal to the neck 110. The shaft 120 illustrated in FIG. 1 comprises a cylindrical shaft 120; in other implementations, however, the shaft may comprise any shape or dimension.

Figure 6:
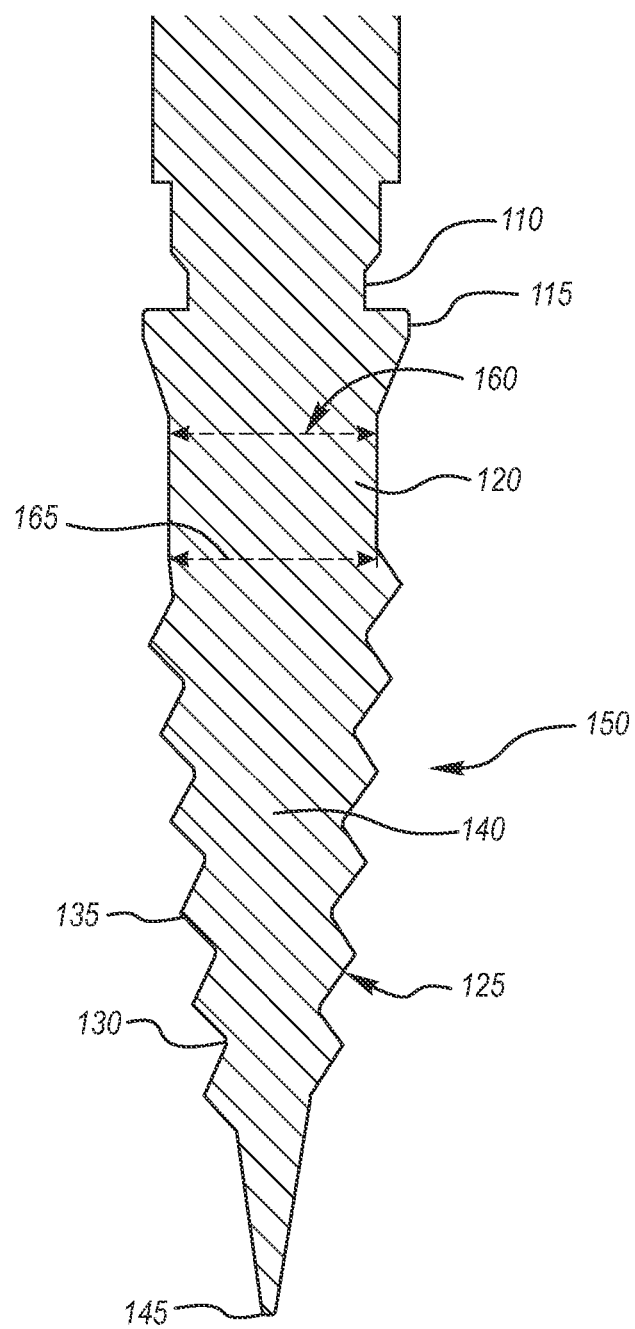
FIG. 6 is a cross sectional view taken along section line 6-6 in FIG. 2.

Implementations of a puncture repair screw 150 may further comprise a right circular cone 140 that narrows uniformly from the shaft 120 the tip 145. The juncture or intersection of the cone 140 and the shaft 120 may comprise a rounded or angled intersection. As shown in FIG. 6, the cone 140 may comprise a maximum diameter 165 that is equal or substantially equal to a diameter 160 of the shaft 120. In other implementations, the maximum diameter 165 of the cone 140 is greater than the diameter 160 of the shaft 120. In still other implementations, the diameter 160 of the shaft may decrease as the shaft approaches the screw head 115.

Though not always completely visible due to the position of the screw thread 125, the right circular cone 140 narrows at uniform rate from the shaft 120 to the tip 145. The rate of narrowing may vary according to different implementations or designs for specific tires. In an implementation, the cone 140 is substantially solid. In other implementations, the cone 140 may comprise a hollow or filled cone 140.

The tire puncture repair tool 100 may further comprise a conical-helical thread 125 coiled or otherwise disposed on or about the cone 140 between the tip 145 and shaft 120. In a particular implementation, the thread 125 continues at least partially onto the shaft. The thread 125 may similarly continue all the way to the tip 145 in some implementations. In the implementation shown in FIG. 1, the ridge 135 at the beginning of thread 125 is aligned with the intersection of the shaft 120 and the cone 140. In some implementations, portions of the thread 125 extend beyond the intersection of the shaft 120 and the cone 140 so that the thread 125, and in some implementations the ridge 135, extend onto the shaft 120. Where the thread 125 begins and/or ends, the thread 125 may begin perpendicular to the cone 140 at its ridge 135 radial height, or may gradually slope to meet the cone 140.

A puncture repair screw 150 that comprises a shaft 120 that continues to at least the beginning of the screw thread 125 is advantageous. Such a configuration lessens the likelihood of the screw 150 falling out of the tire or air leaking through the tire puncture when the puncture repair screw 150 is within the tire. In a particular implementation, the distance between the beginning of the screw thread 125 and the screw head 115 is less than the thickness of an average tire, or more particularly the tire into which the puncture repair screw 150 is designed to be inserted. Puncture repair screws 150 may be designed with differing distances between the beginning of the screw thread 125 and the screw head 115 to function best for differently sized tubeless tire tread and wall thicknesses.

Figure 3:
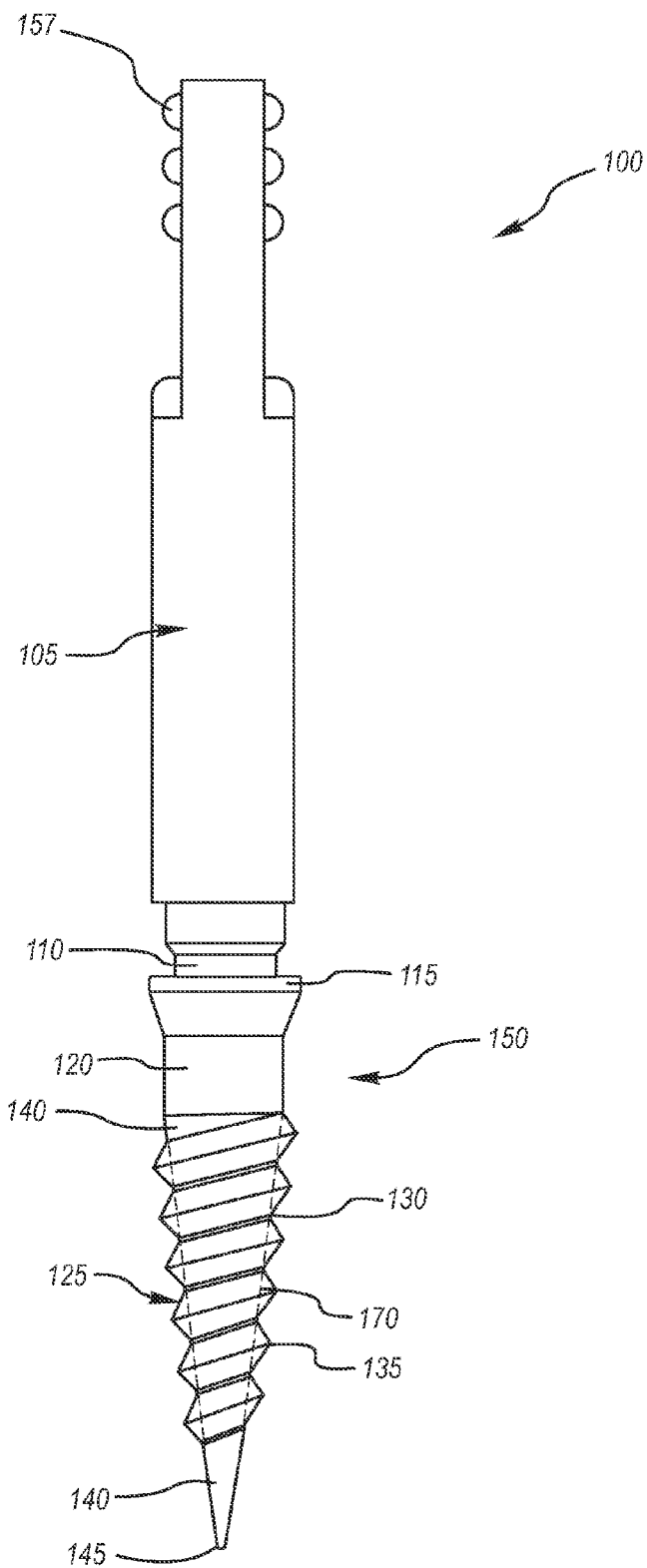
FIG. 3 is a side view of a tire puncture repair tool.
Figure 4:
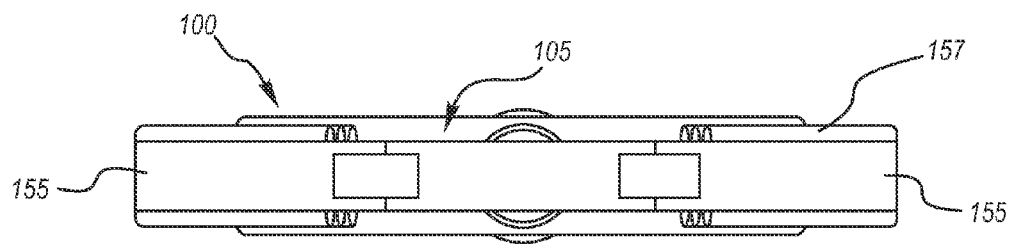
FIG. 4 is a top view of a tire puncture repair tool.
Figure 5:
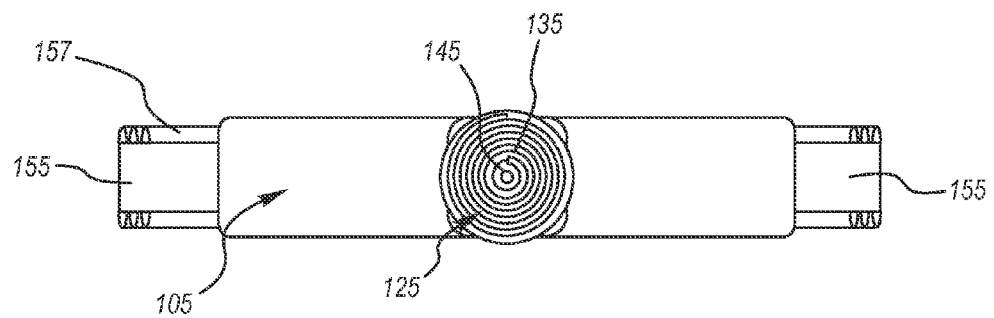
FIG. 5 is a bottom view of a tire puncture repair tool.

As illustrated in FIG. 3, in some implementations, the valleys 130 between the ridges 135 of the screw thread 125 meet the slope or boundary of the right circular cone 140. In FIG. 3, dashed lines represent the continued uniform slope 170 of the cone 140. In the implementation of FIG. 3, the bottoms of the valleys 130 meet the slope 170 of the cone 140. In other implementations, the valleys 130 may not reach the slope 170 of the cone, or may extend beyond the slope 170 of the cone.

Figure 2:
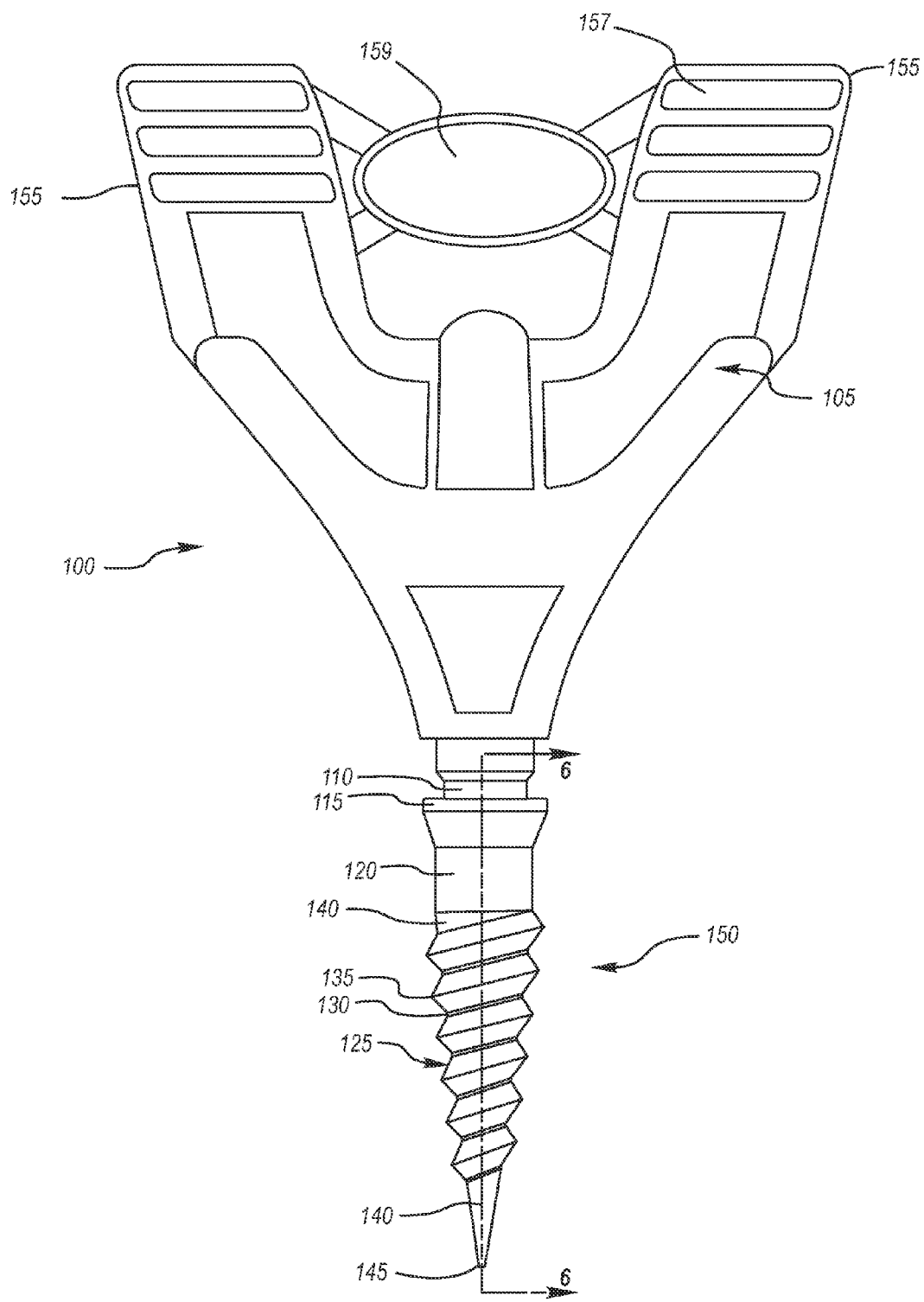
FIG. 2 is a front view of a tire puncture repair tool.

The thread 125 coils down or along the cone 140 in a uniform manner in an implementation, such that the ridges 135 of the thread 125 appear parallel to one another when viewed from the front or the side (see FIGS. 2 and 3). Because the cone 140 tapers uniformly and the thread 125 coils along the cone 140 in a uniform manner in this implementation, a flat plane may be formed on the peaks of the screw thread in a cross-sectioned view, shown in FIG. 6. Furthermore, when view from the front or side, the puncture repair screw 150 may comprise any number of ridges 135. In the implementation of FIGS. 1-6, the puncture repair screw comprises six ridges 135.

As best illustrated in FIG. 6, the thread 125 of a puncture repair screw 150 may comprise an angled ridge 135. The particular angle of the ridge 135 may comprise any angle, such as but not limited to a right angle, and obtuse angle, or an acute angle. The screw thread 125 illustrated in FIGS. 1-6 comprises a sharp-angled peak at the apex of the screw thread ridge 135. In contrast, conventional screw type tire repair tools comprise a screw thread having a well rounded ridge. A sharp-angled peak is advantageous over rounded ridges because the sharp-angled peak lessens the likelihood of the screw falling out of the tire or air leaking through the tire puncture when the puncture repair screw is within the tire.

In particular implementations, the angle of the walls forming the screw thread 125 is at approximately 30-60 degrees relative to the slope 170 of the cone 140, and in particular implementations at approximately 40-50 degrees relative to the slope 170 of the cone 140.

Figure 8:
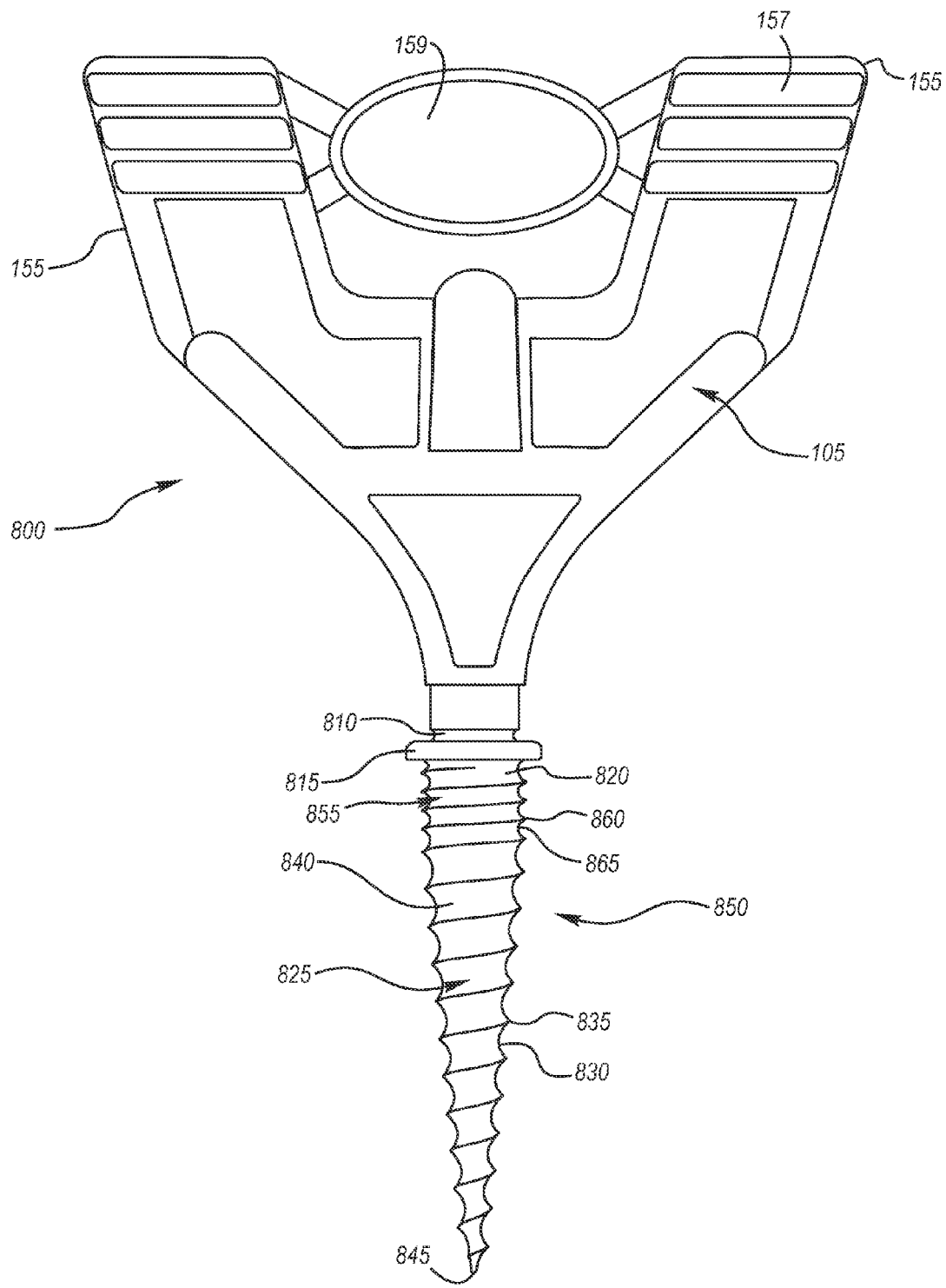
FIG. 8 is a front view of a second implementation of a tire puncture repair tool.

FIG. 8 illustrates another implementation of a tire puncture repair tool 800. In the illustrated implementation, the tire puncture repair tool comprises a handle 105 similar to implementations of handles 105 previously discussed in this document. A tire puncture repair tool may further comprise a more rounded neck 810 or a neck similar to the neck 110 previously discussed in relation to tire puncture repair tool 100. As further illustrated in FIG. 8, a tire puncture repair tool may comprise a flat head 815 between the neck 810 and the shaft 820, or alternatively a head 115 similar to head 115 described in relation to tire puncture repair tool 100.

Similar to the aspects of tire puncture repair tool 100, tire puncture repair tool 800 may comprise a cylindrical shaft 820 that extends from the head 815 to a right circle cone 840. The right circle cone 840 illustrated in FIG. 8 narrows uniformly from the shaft 820 to the tip 845. As previously described in relation to other implementations, the cone 840 comprises a maximum diameter that is equal to or substantially equal to a diameter of the shaft. In other implementations of tire puncture repair tool 800, the maximum diameter of the cone 840 is greater than the diameter of the shaft 820. In still other implementations, the diameter of the shaft 820 decreases or increases as the shaft approaches the screw head 815.

Though not completely visible due to the position of the cone thread 825, the right circular cone 840 narrows at a uniform rate from an end of the shaft 820 to the tip 845. Tire puncture repair tool 800 further comprises a conical-helical cone thread 825 coiled or otherwise disposed on or about the cone 840 between the tip 845 and the shaft 820. While the cone thread 825 illustrated in FIG. 8 comprises angle peaks 835 and rounded valleys 830, other implementations of the tire puncture repair tool may comprise a cone thread 825 similar to that illustrated in relation to tire puncture repair tool 100. Furthermore, while cone thread 825 continues all from the top of the cone 840 substantially to the tip 845, in other implementations the cone thread 825 may begin at or near the top of the cone 840 and end before the tip 845.

Tire puncture repair tool 800 further comprises a helical shaft thread 855 coiled or otherwise disposed on or about the shaft 820 between the head 815 and the cone 840. The shaft thread 855 may comprise angled or rounded peaks 860, and angled or rounded valleys 865. In the implementation illustrated in FIG. 8, the shaft thread 855 comprises angled peaks 860 and rounded valleys 865. According to various aspects, the helical shaft thread 855 may be tightly coiled, resulting in more coils, or loosely coiled, resulting in fewer coils. In other implementations, aspects discussed in reference to tire puncture repair tool 100 may be combined with various aspects of tire puncture repair tool 800.

Implementations of a tire puncture repair tool 100, 800 may comprise of a variety of materials, including but not limited to plastic or metal-based solids. In an implementation, at least a portion of a tire repair puncture tool is comprised of glass infused plastic. This or other implementations may utilize a polypropylene or other thermoplastic polymers.

In particular implementations, the tire puncture repair tool 100 may be utilized by first inserting the tip 145 into a puncture hole of a tire. Although utilization of tire puncture repair tool 100 is referenced, tire puncture repair tool 800 may be utilized in a similar fashion. The puncture repair screw 150 may then be pushed further into the tire by rotating the handle 105 such that the puncture repair screw correspondingly rotates. Once the screw head 115 is at the surface level of the tire, the handle 105 may be bent until the neck 110 breaks, separating the handle 105 from the repair screw 150.

Figure 7A:
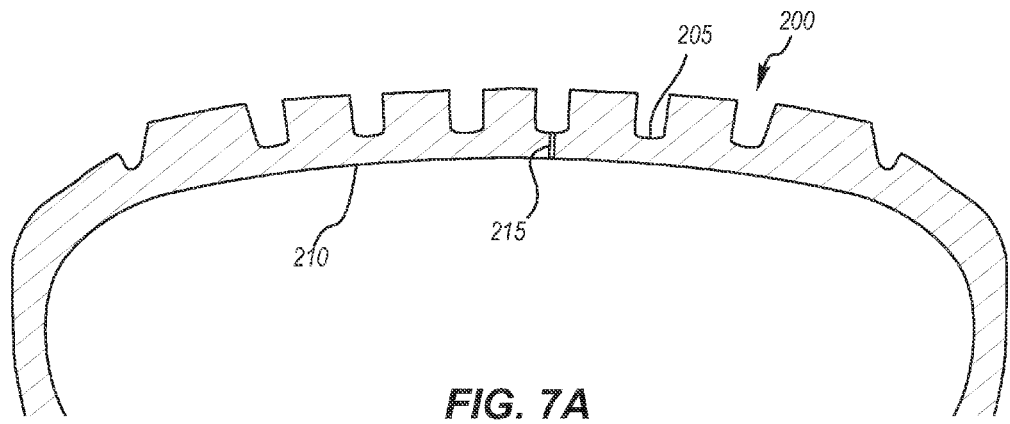
FIG. 7A-C are a sectional views of a tire puncture repair tool in a tire.
Figure 7B:
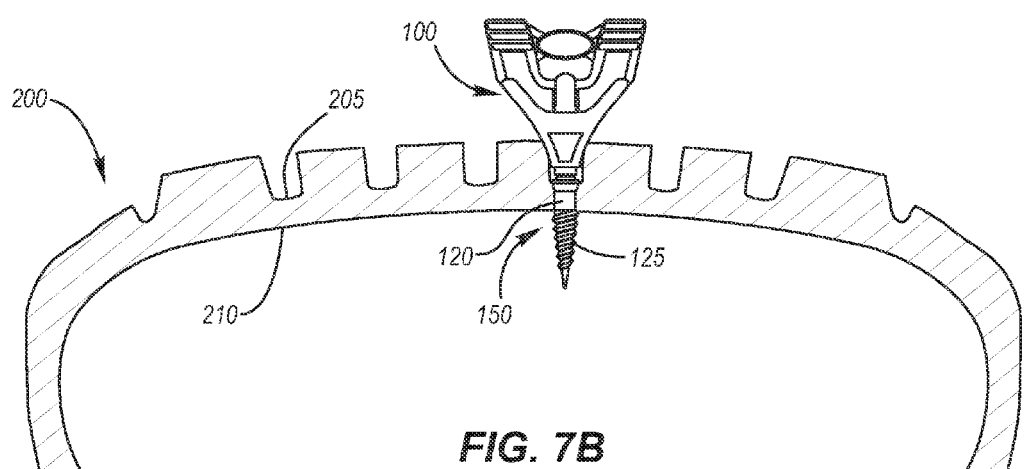
Figure 7C:
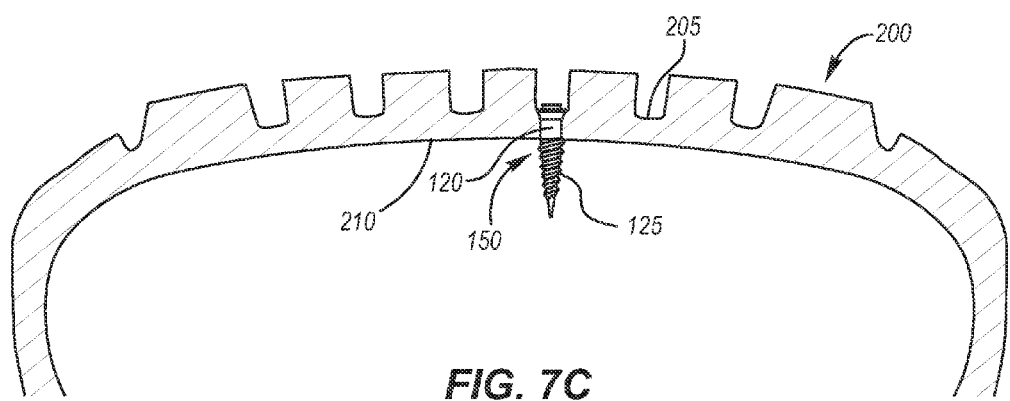

Referring now to FIGS. 7A-C, various implementations of a tire puncture repair tool 100 may be used to plug a puncture 215 in a tubeless tire 200. In FIG. 7A, a cross-sectioned view of a tread portion of a tire 200 is shown. FIG. 7A also illustrates an example of a tire puncture 215, the tire puncture 215 extending from the outside surface 205 of the tire 200 through to the inside surface 210 of the tire 200. Nails, screws or other construction material on the roads often cause tire punctures of this type. Although the puncture 215 is shown at a particular location on the tire 200 in FIG. 7A, the tire puncture repair tool 100 may be utilized to at least temporarily repair a puncture 215 anywhere on a tire 200. FIG. 7B illustrates the tire puncture repair tool 100 after been inserted into the puncture 215 on the tire 200. According to aspects of various implementations, the tire puncture repair tool 100 may be inserted in to the puncture 215 by pressing the tip 145 of the puncture repair screw 150 into puncture 215 on the outside of the tire, then rotating the puncture repair screw 150 by rotating the handle 105 of the tire puncture repair tool 100.

The configuration of the tire puncture repair tool 100 in relation to the thread 125 assists in the insertion of the puncture repair screw 150 into the puncture 215. For example, by providing a uniformly narrowing cone 140 and screw threads 125, the puncture repair screw 150 is less likely to wobble or move about as the puncture repair screw 150 is inserted into the puncture 215. Distinct from a conventional screw that has a consistent diameter for a majority of the length, the threaded portion of the puncture repair screw 150 includes a uniformly narrowing cone. The peak ridges 135 of the thread 125, distinct from prior art approaches to designing a repair screw, provides increased grip or traction to draw the puncture repair screw 150 into the tire 200 as the tire puncture repair tool 100 is rotated from outside the tire 200.

As previously described and illustrated more fully FIGS. 7B and C, the length of shaft 120 of the puncture repair screw 150 between the start of the thread 125 and the neck of the tool, is configured to be substantially equal to but not greater than the distance between the inside surface 210 and the outside surface 205 of the tire 200. This feature provides increased functionality to the tire puncture repair tool 100. The initial ridge 135 of the screw thread 125 is, in various implementations, aligned with the end of the shaft 120. This peaked ridge 135, then, also acts to provide resistance against the puncture repair screw 150 slipping out of the puncture 215. Shafts that are either too long or too short, certainly too long, may be less efficient in repairing the puncture because air may escape more easily even when the puncture repair screw is in place, or the puncture repair screw may more easily slip out of the puncture 215. Accordingly, various implementations of a tire puncture repair tool 100 may comprise different lengthened shafts 120 sized to specifically fit a variety of tires 200.

FIG. 7C illustrates a puncture repair screw 150 within a puncture 215 after the handle 105 has been separated from the puncture repair screw 150. Once the puncture repair screw 150 is within a tire, a user may either continue rotating the handle 105 until the neck 110 breaks, or may alternatively bend the handle 105 back and forth in various directions until the neck 110 breaks. When the neck 110 breaks, the handle 105 may be removed from the puncture repair screw 110, the puncture repair screw 110 remaining within the puncture 215.

It will be understood that implementations are not limited to the specific components disclosed herein, as virtually any components consistent with the intended operation of a method and/or system implementation for tire repair puncture tool may be utilized. Accordingly, for example, although particular tire repair puncture tools may be disclosed, such components may comprise any shape, size, style, type, model, version, class, grade, measurement, concentration, material, weight, quantity, and/or the like consistent with the intended operation of a method and/or system implementation for a tire repair puncture tool may be used.

In places where the description above refers to particular implementations of a tire puncture repair tool, it should be readily apparent that a number of modifications may be made without departing from the spirit thereof and that these implementations may be applied to other tire puncture repair tool. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. A tire puncture repair apparatus, comprising:
   a puncture repair screw, the puncture repair screw comprising a screw head, a cylindrical shaft extending from the screw head, an at least partially threaded and solid right circular cone that uniformly narrows from the shaft to a tip opposite the shaft, and a conic-helical thread coiled about the right circular cone between the tip and the shaft;
   a handle comprising an edge that extends radially outward beyond an edge of the screw head and is configured to allow manual rotation of the handle;
   an integral neck that is integral with the handle and the puncture repair screw, narrower than the screw head, and positioned between the handle and the puncture repair screw coupled to the screw head; and
   wherein a shaft diameter is substantially equal to a cone diameter at the right circular cone's maximum diameter.

2. The tire puncture repair apparatus of claim 1, wherein the thread comprises an angled ridge.

3. The tire puncture repair apparatus of claim 2, wherein the thread is coiled about the cone beginning at least at an intersection of the cone and the shaft and ending at a location before the tip.

4. The tire puncture repair apparatus of claim 3, wherein the handle comprises a winged formation.

5. The tire puncture repair apparatus of claim 4, further comprising an angled valley between each coil of the conic-helical thread.

6. The tire puncture repair apparatus of claim 4, further comprising a rounded valley between each coil of the conic-helical thread.

7. The tire puncture apparatus of claim 1, wherein the conic-helical thread comprises a right handed conic-helical thread.

8. The tire puncture apparatus of claim 1, wherein the at least one edge of the handle comprises at least two winged edges extending away from the puncture repair screw in mirrored opposing directions from each other to form the handle.

9. The tire puncture apparatus of claim 8, further comprising at least one grip element on the at least two wings.

10. The tire puncture repair tool of claim 1, further comprising a helical shaft thread coiled about the shaft between the cone and the screw head.

11. A tire puncture repair apparatus, comprising:
    a handle comprising at least one edge;
    a puncture repair screw integral with the handle, the puncture repair screw comprising a screw head coupled to the handle and a uniformly tapered screw thread, the uniformly tapered screw thread comprising an angled ridge wrapped about a right circular cone in the form of a conic helix, wherein the at least one handle edge extends radially outward beyond an edge of the screw head and is configured to allow manual rotation of the handle;
    a breakable neck coupled between the screw head and the handle;
    a shaft coupled between the screw head and the uniformly tapered screw thread; and
    a tip distal the shaft.

12. The tire puncture repair apparatus of claim 11, wherein the uniformly tapered screw head tapers from the shaft such that a shaft diameter is equal to a cone diameter at the right circular cone's maximum diameter.

13. The tire puncture repair apparatus of claim 12, wherein the thread is coiled about the cone beginning at least at an intersection of the cone and the shaft and ending at a location before the tip.

14. The tire puncture repair apparatus of claim 13, further comprising a helical shaft thread coiled about the shaft between the head and the cone.

15. The tire puncture apparatus of claim 11, wherein the at least one edge of the handle comprises at least two winged edges extending away from the puncture repair screw in mirrored opposing directions from each other to form the handle.

16. The tire puncture apparatus of claim 15, further comprising at least one grip element proximate each of the at least two winged edges.

17. The tire puncture repair apparatus of claim 11, further comprising an angled valley between each coil of the conic-helical thread.

18. The tire puncture repair apparatus of claim 11, further comprising a rounded valley between each coil of the conic-helical thread.

* * * * *